Patented Aug. 22, 1939

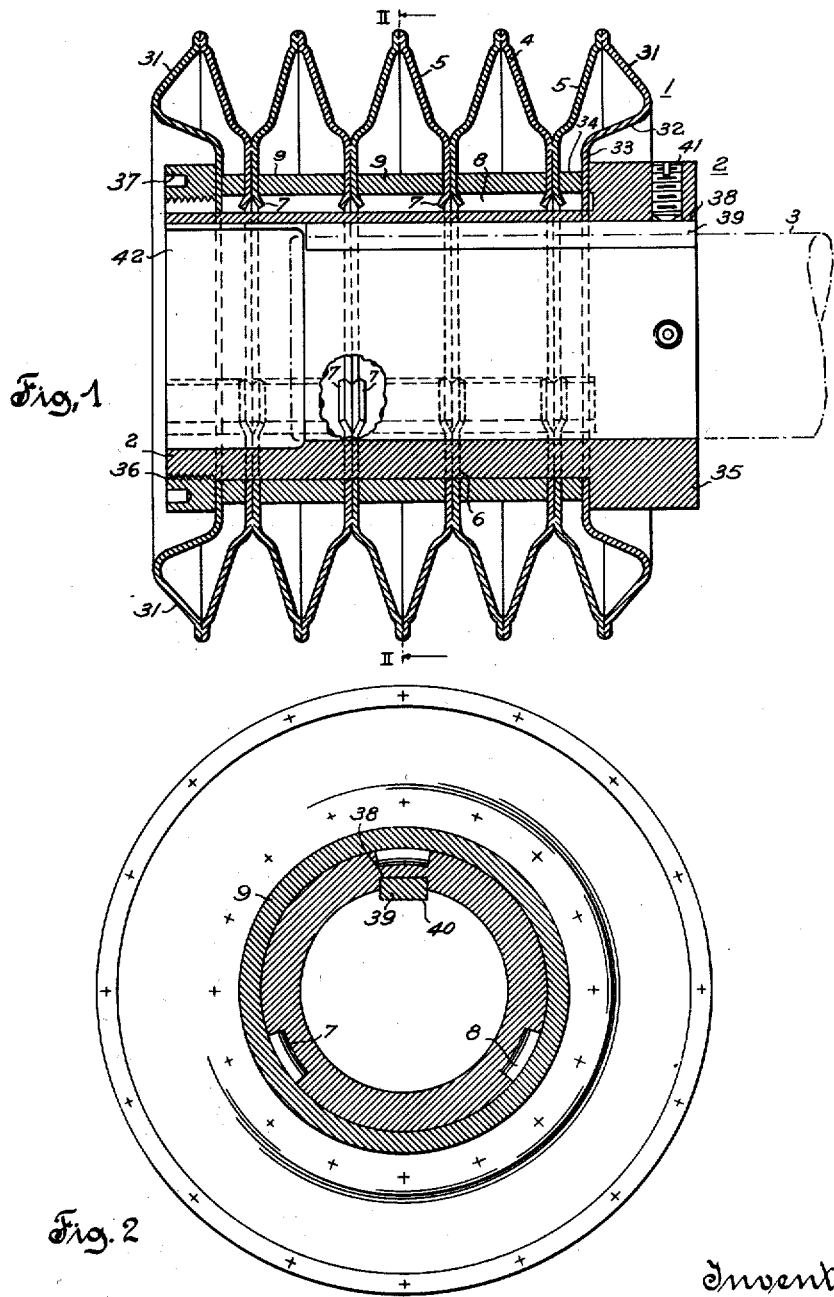

2,170,779

UNITED STATES PATENT OFFICE 2,170,779

SHEET METAL PULLEY

Harry W. Larson, Milwaukee, Wis., assignor to Allis-Chalmers Manufacturing Company, Milwaukee, Wis., a corporation of Delaware Application November 2, 1935, Serial No. 47,938

6 Claims. (Cl. 74—230.8)

This invention relates generally to sheaves and more particularly to pressed steel sheaves of the type having grooves formed in the periphery thereof for cooperating with belts of V-shape cross section in transmitting power.

In supplying users with power transmitting sheaves suitable for a large variety of requirements, it is necessary to maintain large stocks of sheaves of various lengths and diameters in order that the requirements of users may be filled promptly. It has further been necessary heretofore not only to carry a complete stock of sheaves of different sizes, but also to carry in stock for each size of sheave a considerable number of sheaves having hub bores of different diameters to provide for adapting the sheaves to the particular shaft to which the user wishes to apply it, in order that any desired combination of sheave size and hub bore may be quickly available.

Further, in sheet metal sheaves as heretofore constructed, difficulty has been experienced because of the lack of rigidity in the sheave structure, particularly in the end groove structure, the end disks having sometimes failed through lack of proper support.

It is a general object of this invention to provide a power transmitting sheave for V-belts in which the sheave body and the hub are formed as separate interfitting units in such manner that any desired combination of sheave size and hub bore diameter may be assembled readily and quickly from stocks of these separate units, whereby the necessity of carrying stocks of sheaves having all possible combinations of sheave sizes and hub bore diameters is obviated.

Another general object of the invention is to provide a pressed steel sheave of strong and rigid construction, yet of light weight and of simple and inexpensive design.

Another object of the invention is to provide a pressed steel sheave having a unitary self-sustaining body structure provided with a central keyed opening for receiving a hub of any desired internal diameter.

Another object of the invention is to provide a pressed steel sheave formed of plates joined to constitute a unitary structure and spaced at their inner edges by spacing rings retained in position between said plates.

A further object of the invention is to provide a pressed steel sheave formed of plates arranged alternately to constitute belt grooves and having end bracing disks at each end thereof disposed to rigidly support the end groove forming disk.

A further object of the invention is to provide a pressed steel sheave having end bracing disks united at their peripheries with the end groove forming disks and having reentrant central portions providing end sockets for receiving hub retaining flanges.

According to the present invention, pressed steel sheaves are constructed in two distinct and separable parts, sheave body units and hub units. The sheave body units are assembled from pressed steel plates joined together previously by welding and having their inner portions spaced by tubular spacing rings. The central openings of the disks are made in standard size with inwardly projecting keys and the end disks are reinforced by reentrant end bracing disks of strong and rigid construction.

The stated objects of this invention, as well as other objects, will be more fully appreciated upon reading the following detailed description of typical embodiments of the invention that are shown by way of illustration in the accompanying drawing, the several views of which are as follows:

Fig. 1 is a view in medial longitudinal section of a sheet metal pulley and its cooperating hub embodying the invention, part of the hub being broken away to show one of the driving lugs more closely;

Fig. 2 is a view in transverse section of the pulley of Fig. 1 taken on the plane represented by the line II—II therein.

In the specific embodiment illustrated, the sheave is formed in two distinct separable units, a sheave body portion and a cooperating hub-portion. The complete sheave comprises a sheave body unit I and a cooperating hub unit 2 for mounting the sheave on a shaft 3. The sheave body portion I is formed of a plurality of groove defining disks or plates 4 pressed from sheet metal with deflected rim portions forming belt receiving faces 5. The disks 4 are arranged alternately in pairs with the belt receiving deflected rims of each pair cooperating to form a groove for receiving a belt of V-shaped cross section. Each of the disks 4 is provided with a central opening 6 and the openings of the several disks are arranged in alinement for receiving the hub 2. Extending inwardly from the edge of the central opening of each disk is a plurality of driving lugs 7 which are disposed in alinement in manner to engage complementary grooves or key seats 8 in the exterior of the hub 2 in manner to constitute rigid drive connection between the hub 2 and each of the disks. The disks of each pair forming a V-groove are joined together inwardly of the groove previous to assembly by spot welding. The several pairs of disks assembled to constitute the sheave body unit are joined at the peripheries of the adjacent disks of each pair also by spot welding, this being the only portion at which the disks of adjacent pairs contact each other. To form a rigid assembly of the united pairs of disks, the inner portions of the pairs are retained in position by spacing rings 9 of tubular shape disposed between the pairs and concentric with the central openings 6 of the disks. In order that the spacing rings 9 may be retained in position within the sheave unit when it is separated from the hub 2, the driving lugs 7 of each pair of disks are bent outwardly from each other in manner to engage the inner surfaces of the spacing rings for retaining them in concentric relation with the hub opening. By retaining the rings in position in this manner, the sheave body portion may be handled as a unit presenting an internal hub receiving opening of standardized contour adapted to receive a hub of desired internal diameter and having a complementary standardized external contour. By reason of the standardized complementary internal and external surfaces of the sheave unit and hub, respectively, a sheave may be assembled from stocks of sheave units and hub units to have any desired combination of external diameter and internal hub diameter from the stocks of sheave bodies and hubs. In the event that a hub of the internal diameter desired is not available in stock, it is merely necessary to select a hub of smaller internal diameter and rebore it to enlarge the diameter to fit the cooperating shaft.

Special end bracing disks 31 are utilized for the reason that if standard groove forming plates were applied in reversed position, it would be necessary to make the sheet and hub considerably longer as additional full width spacing rings would be necessary in each end of the sheave. To avoid unduly lengthening the sheave, the special end bracing disks 31 are formed with reentrant central portions 32. As shown in Fig. 1, the end bracing disks 31 join the end groove forming disks at their peripheries and extend therefrom radially inward and axially outward to form a conical reinforcing ring and then turn axially inward and radially inward to form a second conical ring within the first conical ring extending axially inwardly beyond the periphery thereof and terminating in a radially disposed central portion 33 having a central opening corresponding to the central openings of the groove forming disks 4. The central portion 33 of the rain-forcing disk 31 is spaced from the central portion of the adjacent groove forming disk by a narrow spacing ring 34, which is held in position by the bent over lugs 7 in the same manner that the spacing rings 9 are held. The hub 2 is provided at one end with a collar 35 that enters within a socket formed in the end of the sheave body portion by the reentrant portions 32 of the end bracing disk 31 and engages with its face the radial portion 33 of the end bracing disk at a position opposite the spacing ring 34. At its other end the hub 2 is provided with screw threads 36 for receiving an internally threaded collar 37 of diameter to fit within the socket formed by the reentrant portion 32 of the other end bracing disk 31 and adapted to abut against the radial portion 33 at a position opposite the adjacent spacing ring 34 in such manner that when the collar 37 is drawn up tight on the hub 2, a compressive force is exerted upon the alined spacing rings 34 and 9 and the interposed inner portions of the groove forming and end bracing disks. Hub 2 is provided on its inner surfaces with key seats 38 for receiving a key 39 that enters into a corresponding key seat 40 in the shaft 3 and is retained therein by means of a set screw 41 threaded radially into the flange end 35 of the hub 2. As the sheave 1 is ordinarily applied to the end of a shaft 3 which is shorter than the bore of the hub 2, the outer end of the hub bore is ordinarily counterbored to a somewhat larger diameter 42. Should it become desirable to substitute in a sheave a hub 2 having a different internal diameter, it is merely necessary to remove the clamping nut 37 from the threaded end of the hub 2 and withdraw the hub from the central opening of the sheave unit. As the individual groove forming end and backing disks are successively joined together by welds at their contacting positions, they remain as a unitary structure after the hub has been removed. Further, the spacing rings 9, being retained by the bent over lugs 7, remain in their proper positions between the pairs of disks and in concentric relation to the hub receiving opening.

The particular embodiment of the invention described herein by way of example is susceptible of various modifications in the details of construction without departing from the spirit and scope of the invention as defined in the subjoined claims.

It is claimed and desired to secure by Letters Patent:

1. A multiple V-groove sheave comprising a plurality of oppositely arranged pressed steel plates disposed to form belt grooves, said plates having circular central openings and spaced lugs extending inwardly from the inner edges of said central openings, and spacer rings disposed between some of said plates at the inner edges thereof, said rings being held in place by said lugs, and means independent of a support for said sheave for securing said plates together thereby forming a unitary grooved structure.

2. A sheave comprising a collection of sheet metal disks each having a flared peripheral belt receiving surface, said disks being arranged in pairs alternately positioned to constitute belt grooves and joined at their points of engagement, adjacent disks of adjacent groove-forming pairs of disks contacting only at their peripheral portions, end disks engaging the next adjacent disk at its periphery and extending axially outward and radially inward and then curved axially inward and radially inward forming a reentrant bend extending inwardly beyond the plane of the disk periphery, and a hub having at one end a shoulder and at the other end a binding nut, both said shoulder and said nut being shaped to be received within the reenerant portions of said end disks.

3. A sheave comprising a hub provided with longitudinal keyways and having a shoulder at one end, a plurality of groove forming disks each having a deflected rim portion constituting an inclined belt receiving surface and a central opening with inwardly projecting axially deflected lugs adapted to engage the keyways of said hub, said disks being arranged alternately in pairs, the belt receiving surfaces of each pair cooperating to form a belt groove, means independent of said hub securing said disks together forming a unitary multiple grooved structure, spacing rings disposed between adjacent pairs of disks at the inner edges thereof and concentric with said rings being retained in position by said axially deflected lugs, a reinforcing end disk at each end of said unitary multiple grooved structure, each of said reinforcing end disks engaging and secured to an adjacent groove forming disk at the periphery thereof and extending axially outward therefrom then curving radially inward and then reentering axially inward beyond the plane of its periphery to form a socket for receiving the shoulder of the hub, a narrow spacer ring disposed between the inner edge of said reenforcing disk and said adjacent groove forming disk and retained by said axially deflected lugs, and a ring nut threaded on the end of said hub opposite said shoulder and adapted to be received within the socket formed by one of said reinforcing end disks for retaining said hub within said multiple groove structure.

4. A steel sheave comprising a plurality of pressed steel disks having circular central openings with inwardly extending lugs and deflected rim portions, said plates being disposed with their deflected rim portions cooperating to form belt grooves and with their central openings and their inwardly extending lugs in axial alinement, said disks being joined to form a unitary sheave structure having a central opening, spacer rings disposed between the inner edges of some of said disks and retained in position by said lugs, a hub having longitudinal grooves disposed within the central opening of said sheave structure with said grooves engaging said alined lugs, and means for securing said hub within said opening.

5. A pressed steel sheave unit, comprising a plurality of pressed steel disks each presenting a peripheral belt receiving surface and having a central hub receiving opening, said disks being arranged in pairs with the belt receiving surfaces of each pair cooperating to form a belt groove, the disks of each pair being welded together adjacent to the base of the groove and adjacent pairs of disks being welded together at the abutting peripheries, spacing rings between adjacent pairs of disks, and inwardly projecting axially deflected lugs on said disks retaining said spacing rings, forming a rigid self-sustaining sheave body unit presenting peripheral grooves for receiving a plurality of belts and presenting a central opening for receiving a cooperating hub.

6. A sheave comprising a hub provided with longitudinal keyways, a plurality of groove forming disks each having a deflected rim portion constituting an inclined belt receiving surface and a central opening with inwardly projecting axially deflected lugs adapted to engage the keyways of said hub, said disks being arranged alternately in pairs, the belt receiving surfaces of each pair cooperating to form a belt groove, means independent of said hub securing said disks together forming a unitary multiple grooved structure, and spacing rings disposed between adjacent pairs of disks at the inner edges thereof and concentric therewith, said rings being retained in position by said axially deflected lugs.

HARRY W. LARSON.

CERTIFICATE OF CORRECTION.

Patent No. 2,170,779. August 22, 1939.

HARRY W. LARSON.

It is hereby certified that error appears in the printed specification of the above numbered patent requiring correction as follows: Page 2, second column, line 61, claim 2, for "reenerant" read reentrant; page 3, first column, line 2, claim 3, strike out "with" and insert instead the word and comma therewith,; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.

disks at the inner edges thereof and concentric with said rings being retained in position by said axially deflected lugs, a reinforcing end disk at each end of said unitary multiple grooved structure, each of said reinforcing end disks engaging and secured to an adjacent groove forming disk at the periphery thereof and extending axially outward therefrom then curving radially inward and then reentering axially inward beyond the plane of its periphery to form a socket for receiving the shoulder of the hub, a narrow spacer ring disposed between the inner edge of said reenforcing disk and said adjacent groove forming disk and retained by said axially deflected lugs, and a ring nut threaded on the end of said hub opposite said shoulder and adapted to be received within the socket formed by one of said reinforcing end disks for retaining said hub within said multiple groove structure.

4. A steel sheave comprising a plurality of pressed steel disks having circular central openings with inwardly extending lugs and deflected rim portions, said plates being disposed with their deflected rim portions cooperating to form belt grooves and with their central openings and their inwardly extending lugs in axial alinement, said disks being joined to form a unitary sheave structure having a central opening, spacer rings disposed between the inner edges of some of said disks and retained in position by said lugs, a hub having longitudinal grooves disposed within the central opening of said sheave structure with said grooves engaging said alined lugs, and means for securing said hub within said opening.

5. A pressed steel sheave unit, comprising a plurality of pressed steel disks each presenting a peripheral belt receiving surface and having a central hub receiving opening, said disks being arranged in pairs with the belt receiving surfaces of each pair cooperating to form a belt groove, the disks of each pair being welded together adjacent to the base of the groove and adjacent pairs of disks being welded together at the abutting peripheries, spacing rings between adjacent pairs of disks, and inwardly projecting axially deflected lugs on said disks retaining said spacing rings, forming a rigid self-sustaining sheave body unit presenting peripheral grooves for receiving a plurality of belts and presenting a central opening for receiving a cooperating hub.

6. A sheave comprising a hub provided with longitudinal keyways, a plurality of groove forming disks each having a deflected rim portion constituting an inclined belt receiving surface and a central opening with inwardly projecting axially deflected lugs adapted to engage the keyways of said hub, said disks being arranged alternately in pairs, the belt receiving surfaces of each pair cooperating to form a belt groove, means independent of said hub securing said disks together forming a unitary multiple grooved structure, and spacing rings disposed between adjacent pairs of disks at the inner edges thereof and concentric therewith, said rings being retained in position by said axially deflected lugs.

HARRY W. LARSON.

CERTIFICATE OF CORRECTION.

Patent No. 2,170,779. August 22, 1939.

HARRY W. LARSON.

It is hereby certified that error appears in the printed specification of the above numbered patent requiring correction as follows: Page 2, second column, line 61, claim 2, for "reenerant" read reentrant; page 3, first column, line 2, claim 3, strike out "with" and insert instead the word and comma therewith,; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.